July 3, 1928.
G. BLUEMEL
1,676,070
FURNACE FOR PRODUCING AND DILUTING PRODUCTS OF COMBUSTION
Filed June 13, 1927     3 Sheets-Sheet 1
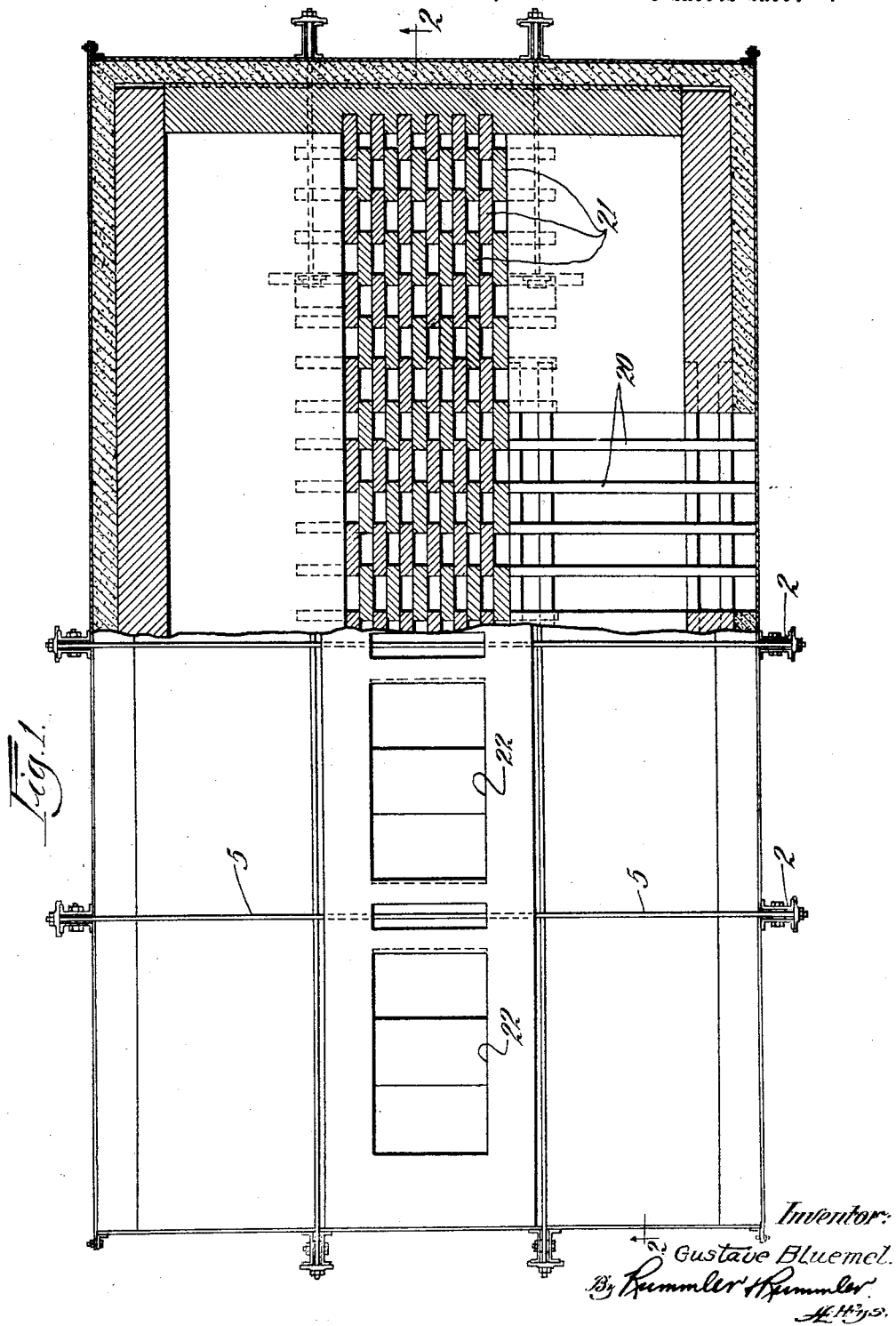
Inventor:
Gustave Bluemel.

July 3, 1928.
G. BLUEMEL
1,676,070
FURNACE FOR PRODUCING AND DILUTING PRODUCTS OF COMBUSTION
Filed June 13, 1927    3 Sheets-Sheet 2
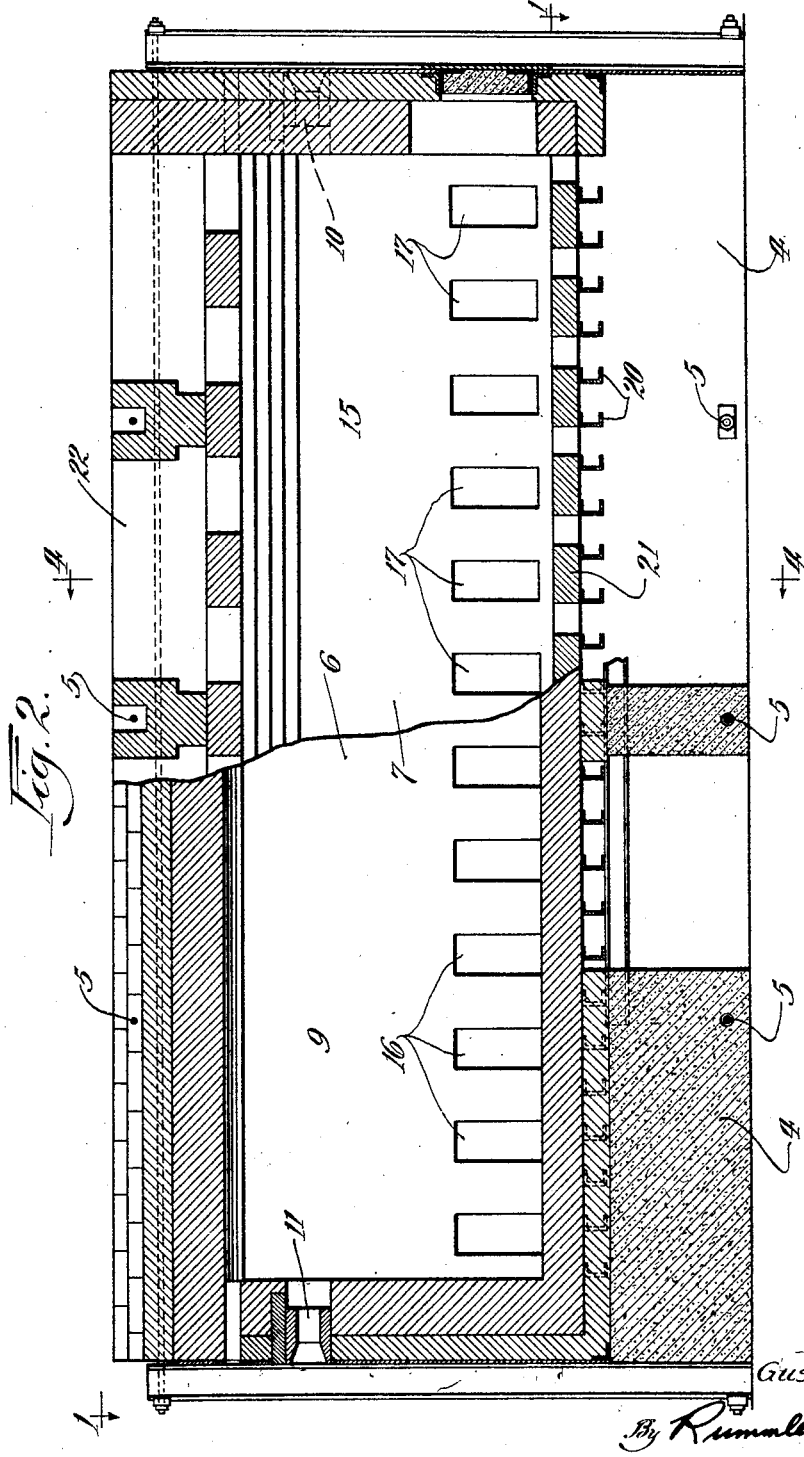
Inventor:
Gustave Bluemel July 3, 1928.
G. BLUEMEL
1,676,070
FURNACE FOR PRODUCING AND DILUTING PRODUCTS OF COMBUSTION
Filed June 13, 1927   3 Sheets-Sheet 3
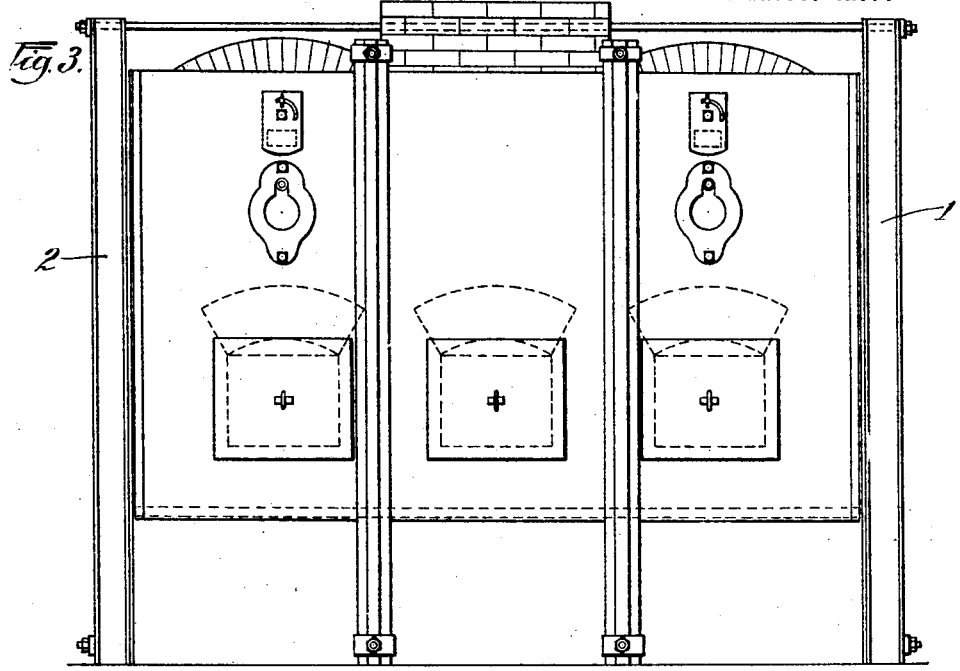
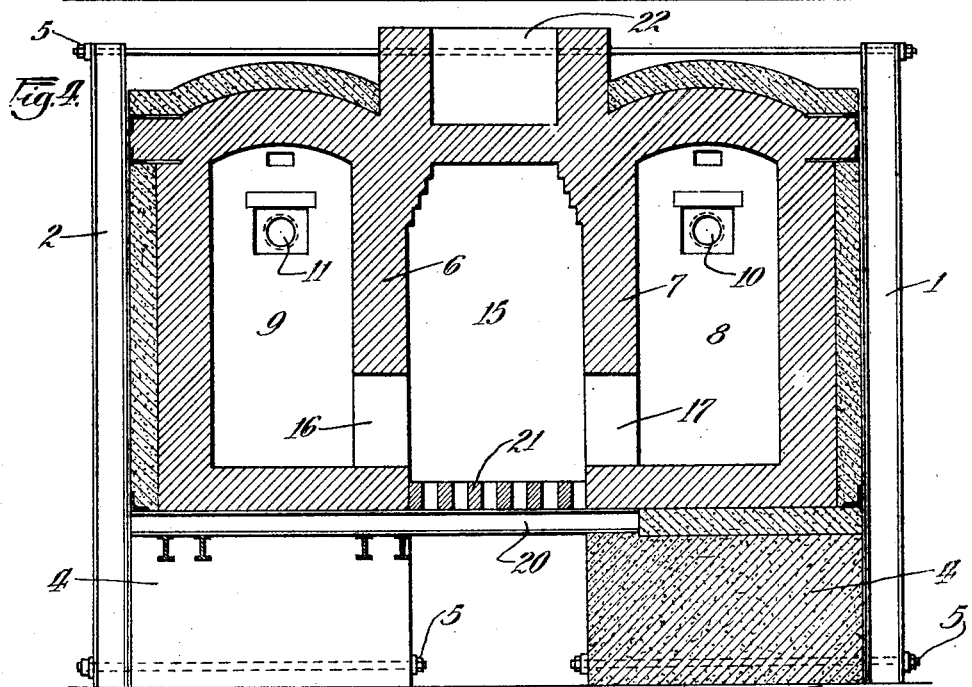
Inventor:
Gustave Bluemel.
By Rummler & Rummler
Attys.

Patented July 3, 1928.

1,676,070

UNITED STATES PATENT OFFICE.

GUSTAVE BLUEMEL, OF CHICAGO, ILLINOIS, ASSIGNOR OF ONE-HALF TO DRYING SYSTEMS, INC., OF CHICAGO, ILLINOIS, A CORPORATION OF ILLINOIS.

FURNACE FOR PRODUCING AND DILUTING PRODUCTS OF COMBUSTION.

Application filed June 13, 1927. Serial No. 198,635.

This invention relates to a type of heater or furnace in which the products of combustion are diluted and cooled by mixing with air to secure diluted products of combustion having a moderate temperature, and is useful, for example, in the molding art for drying cores.

The main objects of this invention are to provide an improved form of furnace which produces products of combustion of moderate temperature; to provide a furnace which is low and compact but arranged in such manner that the products of combustion travel a distance sufficient to secure practically perfect combustion.

An illustrative embodiment of this invention is shown in the accompanying drawings in which:

Figure 1 is a top plan view of the improved furnace, one end thereof being broken away and shown in horizontal section taken on the line 1—1 of Fig. 2.

Fig. 2 is a section taken on the line 2—2 of Fig. 1.

Fig. 3 is a vertical elevation of one end of the improved heater.

Fig. 4 is a section taken on the line 4—4 of Fig. 2.

Heretofore in the construction of furnaces for this particular purpose, it has been very difficult to secure products of combustion which were properly diluted with air so as to lower the temperature thereof and also secure a uniform temperature throughout the mass of the products of combustion.

In furnaces of this type, unless practically perfect combustion takes place in the combustion chamber before the products of combustion pass into the dilution chamber, there will be a secondary combustion at the time the diluting air is mixed with the products of combustion accompanied with a corresponding rise in temperature or if this secondary combustion does not occur, then a considerable amount of unburned carbon will be carried in the diluted mixture and this, of course, is highly objectionable.

Furthermore, when the products of combustion were passed into a diluting chamber to be mixed with air for diluting and cooling the same, it has been very difficult to secure an even and uniform mixing of the products of combustion with the air, which resulted in a spotty or uneven heat and the desired temperature of the diluted products of combustion delivered from the furnace could not be properly controlled.

In order to secure the ideal conditions desired in this type of furnace, it is necessary that the combustion space must be correctly dimensioned and the velocity of the products of combustion must be brought into a definite relationship with the speed of combustion. Furthermore, a sufficiently large radiating surface must be provided to sustain combustion at a temperature as near the ideal flame temperature of the fuel as is possible. Also the products of combustion, as well as the air used for dilution should be divided into a plurality of streams and meet in such a way as to equalize their temperatures in the shortest time possible.

It is obvious that starting from the burner itself a certain minimum distance has to be traversed for proper combustion and proper dilution until the diluted mixture has attained an even temperature throughout. An induced draft furnace wherein this process is carried through in a straight line will naturally either be very long or very high and any attempt to decrease the length of travel must necessarily result in the sacrifice of conditions outlined above. By adopting the principles of down-draft and up-draft as combined in the present invention the gases instead of traveling in a straight line first travel downwardly and then upwardly, thus cutting in two the necessary height of the heater and by arranging the outlets from the combustion chamber at right angles to the inlets for air in the dilution chamber, an exceptionally thorough and rapid mixing of the products of combustion with the air for dilution is secured.

In the present invention this is secured by having horizontal chambers located side by side, one of said chambers being a combustion chamber and the other being a dilution chamber, the initial combustion taking place near the top of the combustion chamber and the products of combustion then passing downwardly and out of the combustion chamber through horizontal ports located at the bottom thereof, which communicates with the dilution chamber, and causes the products of combustion to enter the chamber in a horizontal flow. The dilution chamber is provided with grates along the bottom thereof for admitting air into the dilution chamber in a vertical flow, thus meeting the horizontal flow of products of combustion at an angle to their path of travel and thus securing an excellent mixture in the dilution chamber, the diluted gases being then carried upwardly in the chamber and discharged through suitable openings in the top thereof.

In the construction shown in the drawings, the furnace is shown in the form of a relatively low elongated rectangular structure having exterior side walls 1 and 2, top 3, all mounted on a suitable base 4 and held together by a plurality of tie rods 5 suitably positioned. The interior of the heater is divided into three horizontally disposed parallel chambers by partition walls 6 and 7. The outside chambers 8 and 9 are each provided near the top thereof with burner openings 10 and 11 respectively for admitting fuel to the chambers for combustion therein and these combustion chambers are suitably lined with fire resisting material at the top, bottom, sides and ends thereof for withstanding intense heat. The center chamber 15, which is located between the combustion chambers 8 and 9 is a dilution chamber and communication between it and the combustion chamber is provided by a series of horizontally disposed ports 16 and 17 located at the lower end of the partition walls 6 and 7 for conducting the products of combustion from the combustion chambers into the dilution chamber in a horizontal path of travel. The bottom of the dilution chamber 15 is provided with a series of spaced parallel bars 20 which support thereon a plurality of fire bricks 21 arranged in spaced staggered relationship, as clearly shown in Fig. 1 and the space below the bars 20 communicates with the exterior atmosphere so that air can enter and travel upwardly in a vertical flow through the grating formed by the bars 20 and bricks 21, thus meeting the products of combustion entering through the horizontal ports 16 and 17 at an angle thereto and in this manner securing a thorough and even dilution of the products of combustion, such diluted products being carried upwardly in the dilution chamber 15 and discharged out through suitable ports 22 provided along the top of the dilution chamber 15.

In the operation of this furnace, the fuel is admitted to the combustion chambers near the top thereof and combustion and expansion takes place in the chambers 8 and 9, the products of combustion then being forced downwardly and outwardly through the horizontal ports 16 and 17. As the products of combustion flow into the center chamber 15, air coming through the bottom of the chamber 15 mixes therewith and uniformly and thoroughly dilutes the products of combustion, thus reducing the temperature thereof and providing diluted products of combustion for various industrial uses.

Although but one specific embodiment of this invention has been herein shown and described, it will be understood that numerous details of the construction shown may be altered or omitted without departing from the spirit of this invention as defined by the following claims.

I claim:

1. A furnace for the production of a heating medium, having a pair of chambers arranged side by side in parallel relation and having ports for providing communication therebetween located at the lower portions thereof, means for admitting fuel and air to one of said chambers for combustion therein and means for admitting air to the other of said chambers for diluting the products of combustion.

2. A furnace for the production of a heating medium, having a pair of chambers and having ports for providing communication therebetween located at the lower portions thereof, means for admitting fuel and air to one of said chambers for combustion therein and means for admitting air to the other of said chambers for diluting the products of combustion.

3. A furnace for the production of a heating medium, having a pair of horizontally disposed chambers arranged side by side in parallel relation having ports for providing communication therebetween located at the lower portions thereof, means for admitting fuel and air to one of said chambers for combustion therein and means for admitting air to the other of said chambers for diluting the products of combustion.

4. A furnace for the production of a heating medium, having a pair of horizontally disposed combustion chambers arranged in spaced parallel relation and having a horizontally disposed diluting chamber therebetween, said chambers having ports for providing communication with each other located at the lower portions thereof, means for admitting fuel to said combustion chambers, and means for admitting air to said diluting chamber for diluting the products of combustion.

5. A furnace for the production of a heating medium, having a pair of horizontally disposed chambers arranged side by side in parallel relation and having horizontally disposed ports for providing communication therebetween located at the lower portions thereof, means for admitting fuel to one of said chambers and for combustion therein, products of combustion passing into the other of said chambers through said horizontal ports and means for admitting air from the bottom of said other chamber for striking the products of combustion at an angle to the direction of their travel for diluting said products of combustion and carrying them upwardly in said chamber.

6. A furnace for the production of a heating medium, having a pair of horizontally disposed chambers arranged side by side in parallel relation and having ports for providing communication therebetween located at the lower portions thereof, means for admitting fuel near the top of one of said chambers for combustion therein, and means for admitting air at the bottom of the other of said chambers for diluting the products of combustion.

7. A furnace for the production of a heating medium, having a pair of horizontally disposed chambers arranged side by side in parallel relation, means for admitting fuel to one of said chambers near the top thereof for combustion therein, said chamber having horizontal outlet ports for conducting the products of combustion to the other of said chambers located at the bottom thereof for diluting the products of combustion, said diluting chamber having an outlet at the top thereof for the diluted products of combustion.

Signed at Chicago this 10 day of June 1927.

GUSTAVE BLUEMEL.